United States Patent
Li

(10) Patent No.: US 9,131,158 B2
(45) Date of Patent: Sep. 8, 2015

(54) MOVING-IMAGE CAPTURING APPARATUS AND ELECTRONIC ZOOM METHOD FOR MOVING IMAGE

(71) Applicant: Sony Corporation, Tokyo (JP)

(72) Inventor: Zhiwen Li, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 13/889,749

(22) Filed: May 8, 2013

(65) Prior Publication Data

US 2013/0308014 A1    Nov. 21, 2013

(30) Foreign Application Priority Data

May 16, 2012    (JP) .................................. 2012-112422

(51) Int. Cl.
*H04N 5/262*    (2006.01)
*H04N 5/232*    (2006.01)

(52) U.S. Cl.
CPC ............................... *H04N 5/23296* (2013.01)

(58) Field of Classification Search
CPC . H04N 5/23296; H04N 5/2628; H04N 5/232; H04N 3/1562; H04N 5/23293
USPC ................................. 348/240.99–240.3
See application file for complete search history.

(56) References Cited

U.S. PATENT DOCUMENTS

| 5,959,670 A * | 9/1999 | Tamura et al. ................. 348/364 |
| 2008/0043123 A1* | 2/2008 | Shimomura et al. ........ 348/240.2 |
| 2010/0157107 A1* | 6/2010 | Iijima et al. .............. 348/240.99 |

FOREIGN PATENT DOCUMENTS

JP    2008-294504 A    12/2008

* cited by examiner

*Primary Examiner* — Tuan Ho
*Assistant Examiner* — Selam Gebriel
(74) *Attorney, Agent, or Firm* — Hazuki International, LLC

(57) ABSTRACT

There is provided an apparatus including a moving-image capturing apparatus including a clipping unit configured to clip an image signal according to an image size read from an image sensor based on zoom ratio information, and a size conversion unit configured to perform an image size conversion process as necessary on the image signal clipped by the clipping unit based on the zoom ratio information.

9 Claims, 12 Drawing Sheets

MOVING-IMAGE CAPTURING APPARATUS AND ELECTRONIC ZOOM METHOD FOR MOVING IMAGE

CROSS-REFERENCE TO RELATED APPLICATION

The present application claims priority from Japanese Patent Application No. JP 2012-112422 filed in the Japanese Patent Office on May 16, 2012, the entire content of which is incorporated herein by reference.

BACKGROUND

The present technology relates to a moving-image capturing apparatus for capturing a moving image and an electronic zoom method for the moving image.

For example, both recording of a still image and recording of a moving image can be configured to be enabled, for example, in a digital still-camera apparatus, an electronic device (for example, a smart phone or the like) with a camera function, or the like as an imaging apparatus.

In general, the above-described imaging apparatus has a configuration in which an image sensor is shared in recording (output) of a still image and recording (output) of a moving image. In this case, in the moving image, its output image size is normally set to be less than the number of effective pixels (read image size) of the image sensor in terms of processing capability or the like. For example, when a read image size of the image sensor is about 10 mega (M) pixels, an image size of the recorded moving image is set to about 2 Mpixels (for example, see JP 2008-294504A).

In a system for outputting a moving image according to an image size that is less than a read image size of the image sensor as described above, conversion (reduction) into a moving-image output size is performed in advance in a previous stage of image signal processing with a comparatively heavy processing burden.

Thereby, in an example in which the above-described sensor read image size=10 Mpixels and the moving-image output image size=2 Mpixels, the processing burden can be reduced to about ⅕.

On the other hand, there is an electronic zoom function provided in the imaging apparatus. The electronic zoom function can be implemented, for example, by clipping part of a captured image and adjusting an image size of the clipped image to be consistent with an output image size, if necessary.

For example, in an imaging apparatus for performing an image size reduction process for reducing the above-described processing burden as the imaging apparatus of the related art, a clipping process for the electronic zoom function is performed after a process of reduction to the output image size is performed. That is, in this case, a process of reduction to the output image size→clipping corresponding to a zoom ratio→enlargement of a clipped image to the output image size is performed.

SUMMARY

When the electronic zoom process is implemented in the imaging apparatus of the related art as described above, the clipped image should be enlarged to be adjusted to the output image size. As a result, a deterioration of image quality of the output image is inevitable.

As the electronic zoom function, for example, partial reading of the image sensor can also be implemented in addition to a technique of clipping an image signal as described above.

However, in this case, because it is necessary to design a reading circuit for implementing an image sensor by which partial reading is possible, it is necessary to switch a driving scheme of the reading circuit according to a zoom ratio, or the like, the complexity of a circuit configuration or a circuit scale increases, and hence cost increases.

It is desirable to suppress a deterioration of image quality due to an electronic zoom on a moving image and make simple and low-cost implementation possible without a complex configuration.

To solve the above-described issue, a moving-image capturing apparatus for capturing a moving image in the present technology is configured as follows.

That is, the moving-image capturing apparatus according to an embodiment of the present technology includes a clipping unit configured to clip an image signal according to an image size read from an image sensor based on zoom ratio information.

In addition, the moving-image capturing apparatus includes a size conversion unit configured to perform an image size conversion process on the image signal clipped by the clipping unit based on the zoom ratio information, if necessary.

According to the above-described embodiment of the present technology, the electronic zoom function is implemented by clipping a captured image and then performing the image size conversion corresponding to necessity. Thereby, because a necessary image size enlargement process when clipping is performed after the size conversion according to the related art is unnecessary, image deterioration can be effectively prevented.

In addition, because it is unnecessary for an image sensor to perform partial reading when an electronic zoom function is implemented in accordance with the embodiment of the present technology, an increase in the complexity of a configuration and cost can be prevented.

According to the embodiments of the present technology described above, it is possible to suppress the deterioration of image quality due to an electronic zoom on a moving image and make simple and low-cost implementation possible without a complex configuration.

DETAILED DESCRIPTION OF THE EMBODIMENT(S)

Figure 1:
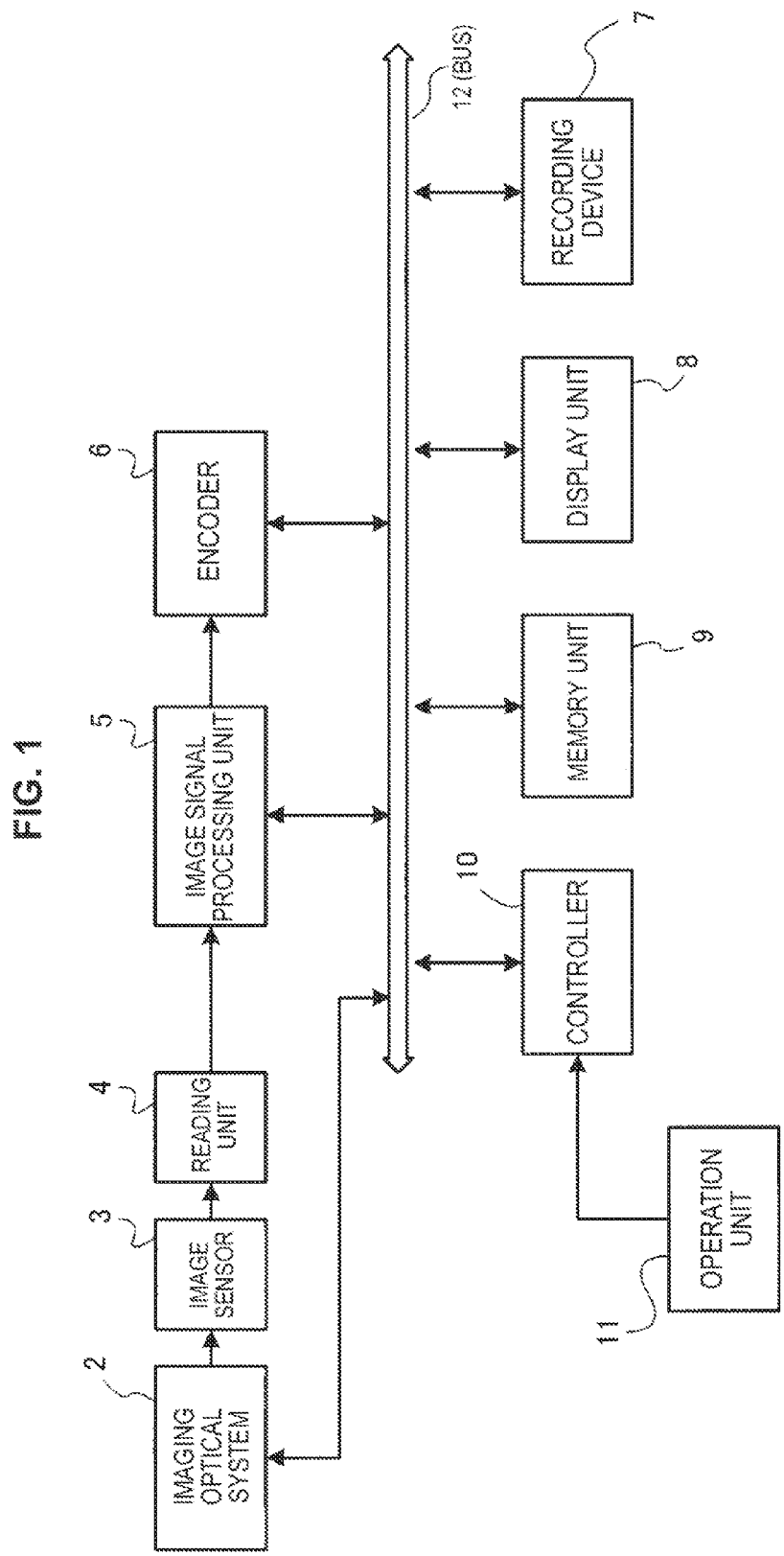
FIG. 1 is a block diagram illustrating an internal configuration of an imaging apparatus of an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an embodiment in accordance with the present technology will be described.

Also, description will be given in the following order.
<1. Entire Configuration of Imaging Apparatus>
<2. Technique of Related Art>
<3. Electronic Zoom Technique of Embodiment>
[3.1. Outline]
[3.2. Specific Example of Clipping Technique]
[3.3. Synchronous Transfer]
<4. Modified Example>

1. Entire Configuration of Imaging Apparatus

FIG. 1 is a block diagram illustrating an internal configuration of an imaging apparatus 1 serving as an embodiment in accordance with the present technology.

The imaging apparatus 1 of this embodiment is configured to selectively execute recording of a still image and recording of a moving image according to a user operation. In addition, the imaging apparatus 1 of this embodiment has an electronic zoom function of electronically enlarging/reducing the image in terms of the recorded moving image.

In FIG. 1, the imaging apparatus 1 includes an imaging optical system 2, an image sensor 3, a reading unit 4, an image signal processing unit 5, an encoding/decoding unit 6, a recording device 7, a display unit 8, a memory unit 9, a controller 10, and an operation unit 11. In addition, the imaging apparatus 1 includes a bus 12. Parts of the imaging optical system 2, the image signal processing unit 5, the encoding/decoding unit 6, the recording device 7, the display unit 8, the memory unit 9, and the controller 10 are mutually connected via the bus 12. The parts connected to the bus 12 can perform the transmission of data or the exchange of a command (control signal) via the bus 12.

The imaging optical system 2 forms an optical image of a subject on an imaging plane of the image sensor 3. The imaging optical system 2 has a mechanism for adjusting a focal length, a subject distance, an aperture, and the like so that an appropriate image is obtained according to an instruction from the controller 10.

The image sensor 3 converts the formed optical image into an electric signal according to photoelectric conversion. Specifically, the image sensor 3 is implemented by a charge coupled device (CCD) sensor, a complementary metal oxide semiconductor (CMOS) sensor, or the like.

The reading unit 4 obtains a captured image signal by reading the electrical signal obtained by the image sensor 3.

The image signal processing unit 5 performs predetermined image signal processing on the above-described captured image signal obtained by the reading unit 4.

Also, an internal configuration of the image signal processing unit 5 will be described later.

The encoding/decoding unit 6 is configured to obtain compressed image data by performing a predetermined encoding process on the captured image signal after the image signal processing unit 5 performs predetermined image signal processing, and perform a decoding process on input compressed image data.

Specifically, based on an instruction from the controller 10, the encoding/decoding unit 6 obtains compressed still-image data by performing an encoding process on the above-described captured image signal, for example, according to predetermined still-image compression coding such as a Joint Photographic Experts Group (JPEG) format, during still-image recording, and obtains compressed moving-image data by performing an encoding process, for example, according to predetermined moving-image compression coding such as H.264 (MPEG-4 AVC), during moving-image recording.

In addition, during reproduction, a process of decoding the input compressed image data is performed based on an instruction from the controller 10.

The recording device 7 includes a recording medium such as a semiconductor memory such as a flash memory, a magnetic disk, an optical disc, or a magneto-optical disc and a recording reproduction system circuit/mechanism for the recording medium.

During recording, the compressed still-image data and the compressed moving-image data obtained by the encoding/decoding unit 6 is supplied to the recording device 7. The recording device 7 records the compressed still-image data and the compressed moving-image data supplied as described above on the above-described recording medium.

In addition, during reproduction, the compressed still-image data and the compressed moving-image data stored on the above-described recording medium is read to the memory unit 9 and subjected to a decoding process by the encoding/decoding unit 6. The decoded image data can also be displayed on the display unit 8 or output to an external device through an external interface (not illustrated).

The display unit 8 includes a digital-to-analog (D/A) conversion circuit for converting input image data into an analog image signal, a video encoder for encoding the analog image signal into a video signal in a format suitable for a subsequent-stage display apparatus, and the display apparatus for displaying an image corresponding to the input video signal.

The above-described display apparatus, for example, is implemented by a liquid crystal display (LCD) or organic electroluminescence (EL) panel, and also has a function as a finder.

The controller 10 includes a central processing unit (CPU) and a control program, and controls the parts of the imaging apparatus 1. The above-described control program itself, for example, is stored in the memory unit 9, and executed by the above-described CPU.

The operation unit 11 is connected to the controller 10. The operation unit 11, for example, includes a hardware key such as a shutter button, an operation dial, or an input device such as a touch panel, detects an input operation of an imaging person (user), and delivers the detected input operation to the controller 10. The controller determines an operation of the imaging apparatus 1 according to the input operation of the user, and controls each part to perform a necessary operation.

In particular, in this embodiment, the operation unit 11 is configured so that a zoom operation by the user is possible, and the controller 10 calculates a zoom ratio (a zoom ratio of an electronic zoom) according to the zoom operation.

In this embodiment as will be described later, the image signal processing unit 5 is set to execute a clipping process for implementing the electronic zoom function, and the controller 10 supplies zoom ratio information corresponding to the calculated zoom ratio to the image signal processing unit 5.

Specifically, in this example, the above-described zoom ratio information is assumed to be information regarding a clipping start pixel position and information regarding an image size (the number of pixels) of a clipped image.

The memory unit 9, for example, includes a semiconductor memory such as a dynamic random access memory (DRAM), and records the image data obtained by the encoding/decoding unit 6, various data handled by the controller 10, the image data processed by the image signal processing unit 5, and the like.

2. Technique of Related Art

Before the description of the electronic zoom technique of the embodiment, the electronic zoom scheme of the related art will first be specifically described.

Figure 2:
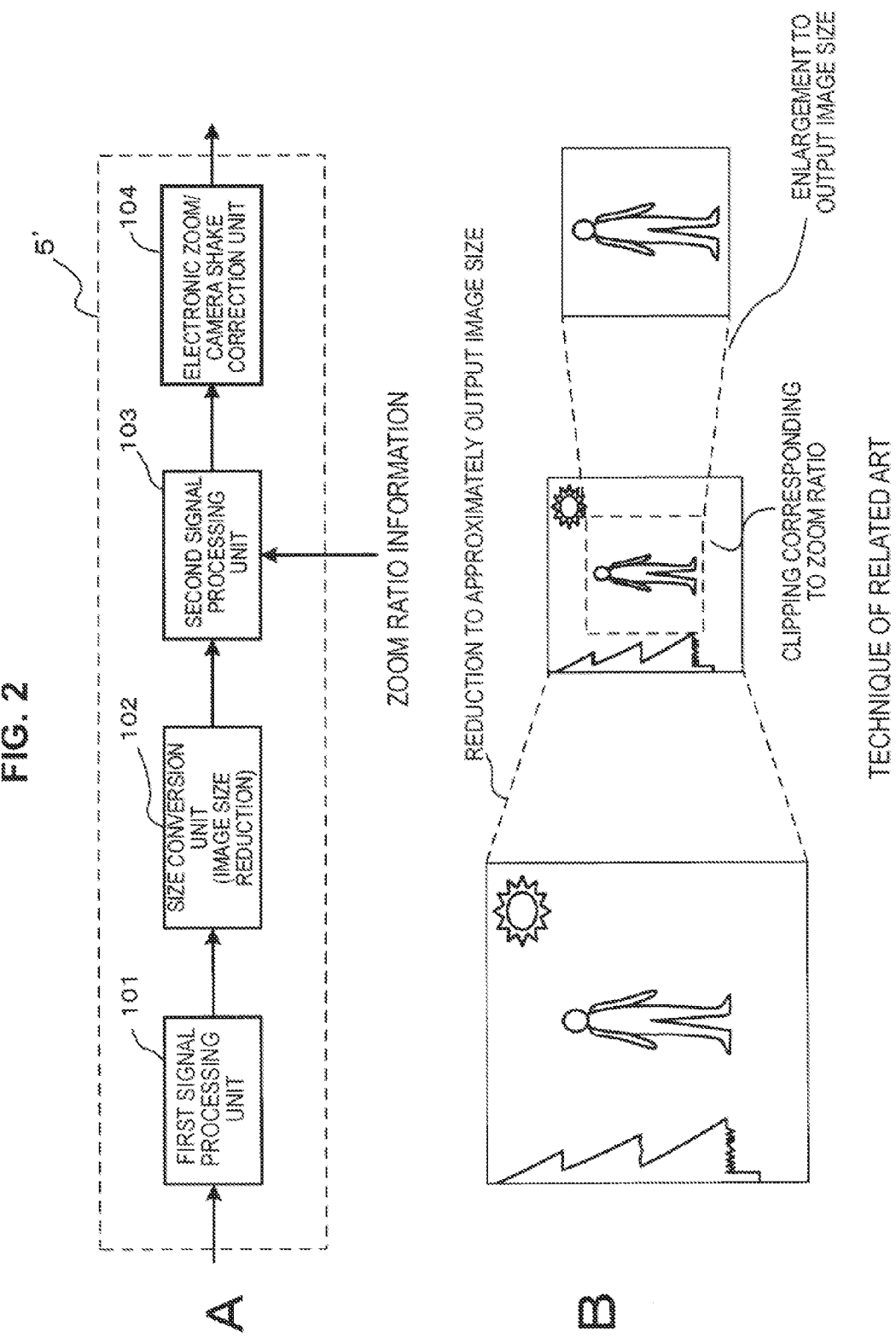
FIGS. 2A and 2B are explanatory diagrams illustrating an electronic zoom technique in an imaging apparatus of the related art.

FIGS. 2A and 2B are explanatory diagrams illustrating the electronic zoom technique in an imaging apparatus of the related art.

In FIGS. 2A and 2B, FIG. 2A illustrates an internal configuration of an image signal processing unit 5' provided in the imaging apparatus of the related art.

As illustrated in FIG. 2A, the image signal processing unit 5' of the related art includes a first signal processing unit 101, a size conversion unit 102, a second signal processing unit 103, and an electronic zoom/camera shake correction unit 104.

A read image of the image sensor 3 from the reading unit 4 is input to the first signal processing unit 101, and a clamp adjustment process or a white balance adjustment process is performed.

The size conversion unit 102 performs an image size conversion process on an image signal processed by the first signal processing unit 101.

In addition, the second signal processing unit 103 performs a pixel interpolation process or a contour enhancement process on the image signal after the image size conversion by the size conversion unit 102.

The electronic zoom/camera shake correction unit 104 performs an electronic zoom process and a camera shake correction process on the image signal after processing by the second signal processing unit 103.

Zoom ratio information from an outside is given to the electronic zoom/camera shake correction unit 104, and an electronic zoom function is implemented by clipping part of the input image according to the zoom ratio information.

Here, the clamp adjustment process or the white balance adjustment process to be executed by the first signal processing unit 101 is a simple process in which a calculation amount is comparatively small.

On the other hand, the pixel interpolation process or the contour enhancement process to be executed by the second signal processing unit 103 is a process in which a calculation amount is large and a processing burden is comparatively large. When the above-described process in which the calculation amount is large is performed in the read image size of the image sensor 3, significant signal processing capability is necessary, a circuit scale of the second signal processing unit 103 is large, and power consumption also increases.

Therefore, in the related art, as illustrated in FIG. 2A, the size conversion unit 102 reduces the image size before processing by the second signal processing unit 103 is performed. Specifically, the size conversion unit 102 reduces the image size to approximately the output image size (recorded image size) of a moving image.

FIG. 2B schematically illustrates the image size reduction process performed by the size conversion unit 102 and the electronic zoom process (clipping/enlargement process) performed by the electronic zoom/camera shake correction unit 104 illustrated in FIG. 2A.

As illustrated in FIG. 2B, in the configuration of the related art illustrated in FIG. 2A, an image reduced to approximately the output image size is subjected to clipping corresponding to a zoom ratio. Therefore, the image enlargement process is performed to adjust the clipped image as described above to the output image size. Also, the enlargement process is performed by the electronic zoom/camera shake correction unit 104.

In the technique of the related art in which clipping corresponding to the zoom ratio is performed after size reduction as described above, the enlargement process for adjusting the clipped image to the output image size is necessary. Because of this, a deterioration of image quality of an output image (degradation of a sense of resolution) is inevitable in the related art.

Here, as the electronic zoom function, for example, partial reading of the image sensor can be performed in addition to the technique of clipping an image signal after reading of the sensor. According to this, the degradation of the sense of resolution can be minimized.

However, it is necessary to design a reading circuit for implementing an image sensor by which partial reading is possible. In addition, it is necessary to switch a driving scheme of the reading circuit according to the zoom ratio. From these points, the technique of implementing the electronic zoom function by partial reading of the image sensor results in an increase in the complexity of a circuit configuration and an increase in a circuit scale and hence results in an increase in cost.

This embodiment has been made in view of the above-described issues, and it is desirable to suppress a deterioration of image quality due to an electronic zoom on a moving image and make simple and low-cost implementation possible without a complex configuration.

3. Electronic Zoom Technique of Embodiment

[3.1. Outline]

Figure 3:
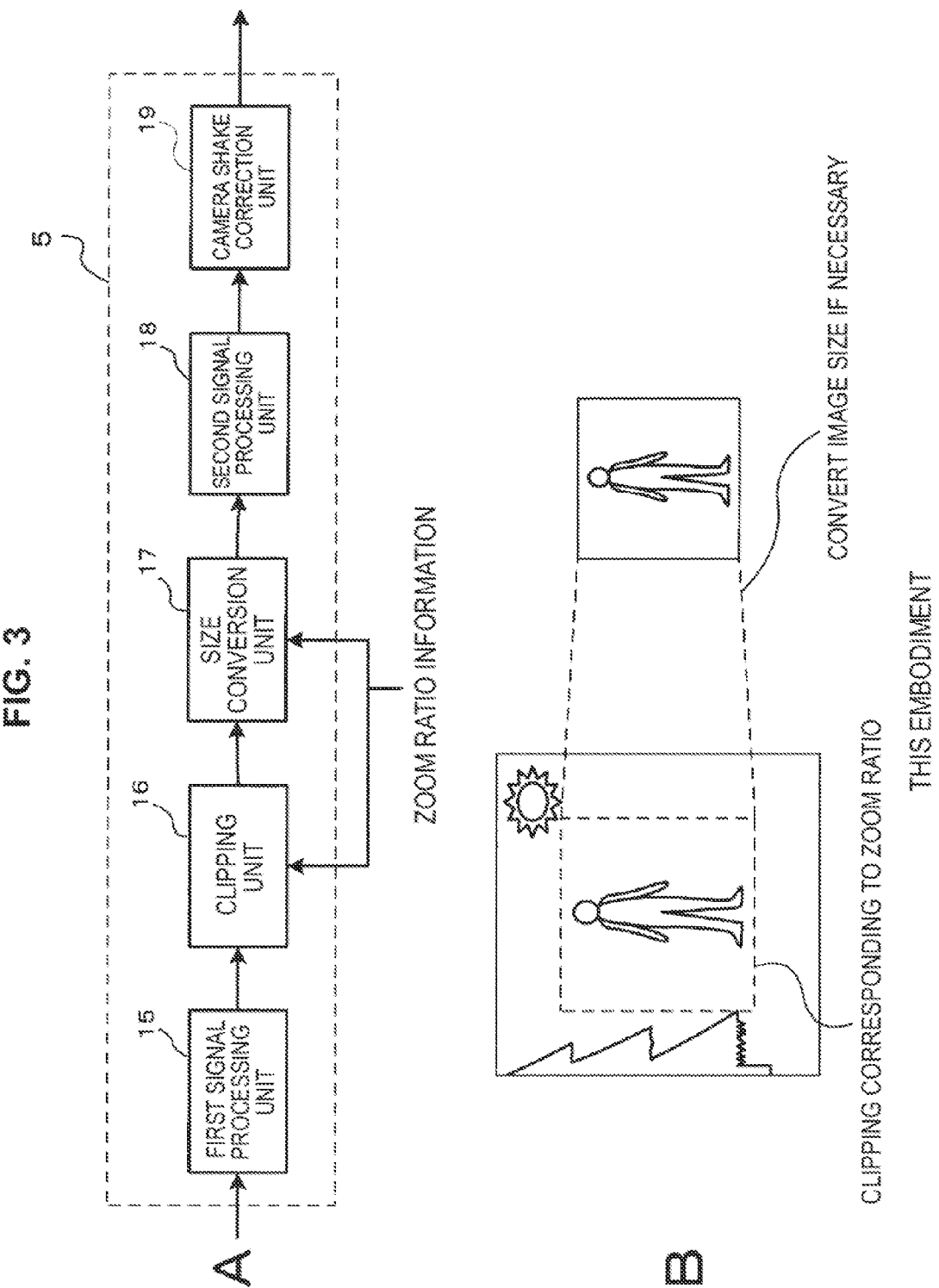
FIGS. 3A and 3B are explanatory diagrams illustrating an outline of an electronic zoom technique of an embodiment.

FIGS. 3A and 3B are explanatory diagrams illustrating an outline of the electronic zoom technique of the embodiment.

FIG. 3A is a block diagram illustrating an internal configuration of the image signal processing unit 5 illustrated in FIG. 1.

As illustrated, the image signal processing unit 5 includes a first signal processing unit 15, a clipping unit 16, a size conversion unit 17, a second signal processing unit 18, and a camera shake correction unit 19.

Like the first signal processing unit 101 described above, the first signal processing unit 15 performs a clamp adjustment process or a white balance adjustment process on an image signal obtained by the reading unit 4.

As described above, the above-described processes have a comparatively small calculation amount, and an increase in a circuit scale or power consumption can be suppressed even when the processes are performed in the read image size of the image sensor 3.

In the clipping unit 16, an image signal after processing by the first signal processing unit 15 is clipped. In the clipping unit 16, the clipping is performed according to the zoom ratio information from the controller 10 illustrated in FIG. 1.

Also, the internal configuration of the clipping unit 16 will be described again later.

The size conversion unit 17 performs an image size conversion process on the clipped image signal obtained by the clipping unit 16 if necessary.

Here, because the clipped image size obtained by the clipping unit 16 is a size corresponding to the zoom ratio, the clipped image size is not necessarily consistent with a moving-image output image size. The size conversion unit 17 converts an image size of the image clipped by the clipping unit 16 into a size corresponding to the moving-image output image size. Specifically, in this example, from a relationship that the camera shake correction process is performed in a subsequent stage, the conversion into a predetermined image size of approximately the output image size is performed.

Based on the zoom ratio information supplied from the controller 10, the size conversion unit 17 determines a reduction amount of the image size and performs an image size conversion process.

Also, the image size conversion process, for example, can be implemented by simple thinning or image addition, a resolution conversion technique by a filter, or the like.

The second signal processing unit 18 performs the pixel interpolation process or the contour enhancement process similar to that of the above-described second signal processing unit 103 on the image signal after the size conversion process by the size conversion unit 17.

The camera shake correction unit 19 performs a camera shake correction process on the image signal processed by the second signal processing unit 103. The camera shake correction process, for example, can be implemented by clipping a predetermined image region specified based on a motion vector detection result.

FIG. 3B schematically illustrates clipping in the clipping unit 16 and size conversion by the size conversion unit 17.

As illustrated in FIG. 3B, the image size conversion into approximately the output image size is performed after the read image size of the image sensor 3 is subjected to clipping corresponding to the zoom ratio according to the configuration of the image signal processing unit 5 illustrated in FIG. 3A.

According to the electronic zoom technique serving as the above-described embodiment, it is not necessary to perform the enlargement process for ultimately adjusting to the output image size as in the technique of the related art in which clipping corresponding to a zoom ratio is performed after the size conversion. Thereby, it is possible to effectively suppress a deterioration of a sense of resolution of the output image and suppress image deterioration.

In addition, in accordance with this embodiment compared to the technique of the related art for performing image size conversion at a fixed reduction rate as the read image size→the output image size, the image size depends upon the zoom ratio, but the reduction rate of the image size can be decreased. That is, even in this point, a deterioration of image quality can be suppressed as compared to the technique of the related art.

In addition, in accordance with this embodiment, it is not necessary to perform partial reading of the image sensor 3 when the electronic zoom function is implemented. In this point, an increase in the complexity of a configuration or an increase in cost is prevented.

In accordance with this embodiment as described above, it is possible to suppress a deterioration of image quality due to an electronic zoom on a moving image and make simple and low-cost implementation possible without a complex configuration.

[3.2. Specific Example of Clipping Technique]

Figure 4:
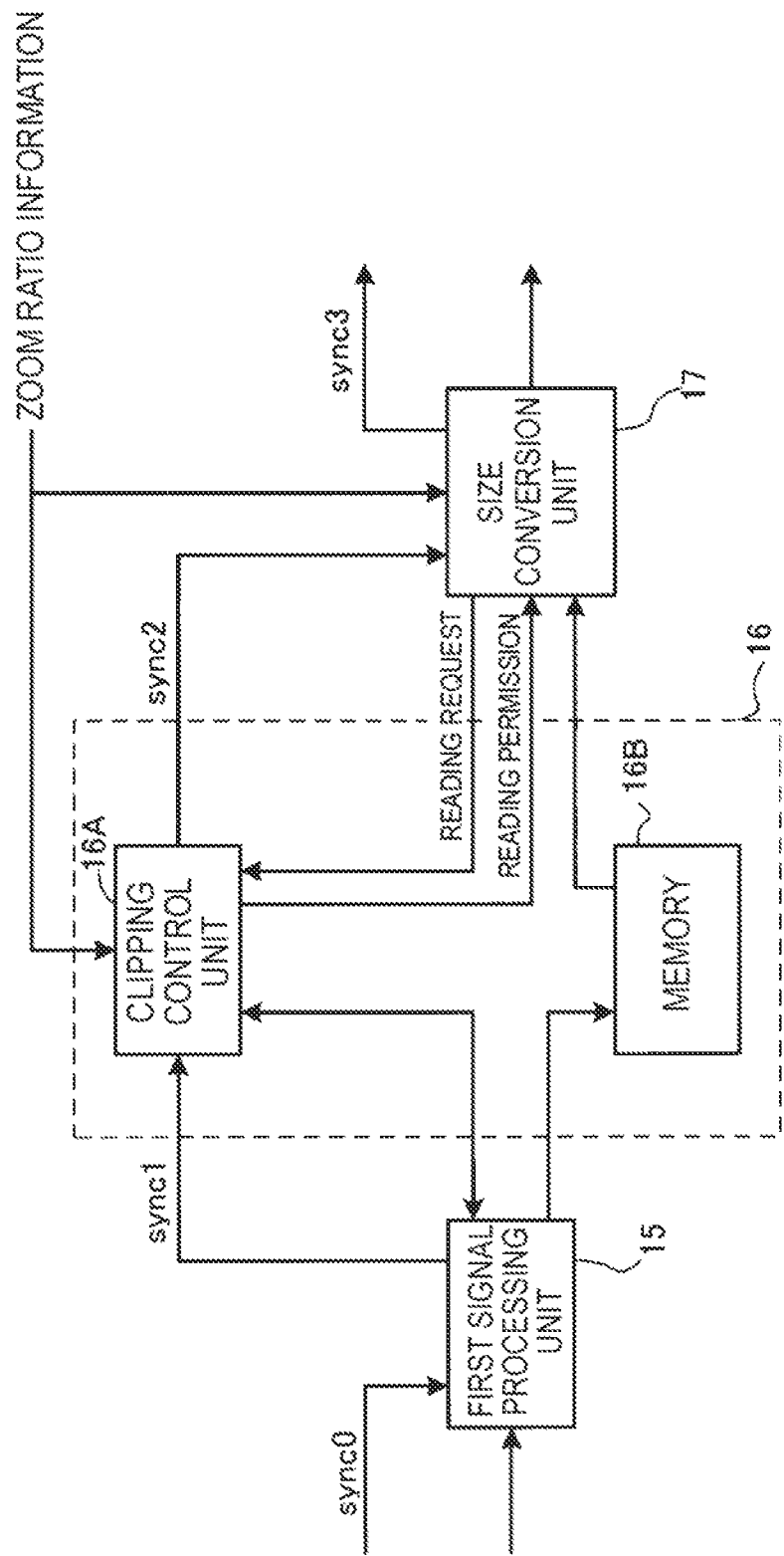
FIG. 4 is an explanatory diagram illustrating a specific configuration relating to clipping.

FIG. 4 is an explanatory diagram illustrating a specific configuration relating to clipping.

In FIG. 4, the first signal processing unit 15 and the size conversion unit 17 are illustrated along with the internal configuration of the clipping unit 16.

As illustrated, a clipping control unit 16A and a memory 16B are provided in the clipping unit 16.

The zoom ratio information from the controller 10 is input to the clipping control unit 16A. In addition, a synchronous signal sync1 is input from the first signal processing unit 15 to the clipping control unit 16A.

Here, a synchronous signal sync representing a head (start) timing of a processing time corresponding to one frame is propagated to each part within the image signal processing unit 5.

As in the drawing, the synchronous signal sync input to the first signal processing unit 15 is set as "sync0," the synchronous signal sync output from the first signal processing unit 15 to the clipping control unit 16A is set as "sync1," the synchronous signal sync output from the clipping control unit 16A to the size conversion unit 17 is set as "sync2," and the synchronous signal sync output from the size conversion unit 17 to the second signal processing unit 18 illustrated in FIG. 3A is set as "sync3."

In this embodiment, the clipping control unit 16A causes the first signal processing unit 15 to selectively store images processed by the first signal processing unit 15 in the memory 16B according to zoom ratio information and causes the size conversion unit 17 to sequentially read the accumulated images, so that image clipping is implemented.

First, control relating to image writing by the first signal processing unit 15 to the memory 16B will be described.

Every time the first signal processing unit 15 outputs image data, the clipping control unit 16A counts up an output pixel count value Gct and specifies a current output pixel position (coordinates) using the output pixel count value Gct.

According to a state in which the output pixel position specified as described above has reached a clipping start pixel position indicated from the controller 10, the first signal processing unit 15 is caused to start writing of the image data to be output thereafter to the memory 16B.

Then, after writing of the image data to the memory 16B has been started as described above, the number of written pixels is specified by counting up a written pixel count value Wct every time there is writing. According to a state in which the number of written pixels has been consistent with the number of clipping pixels indicated from the controller 10 as the zoom ratio information, the writing by the first signal processing unit 15 to the memory 16B is stopped.

Thereby, only images of a range corresponding to the zoom ratio can be selectively accumulated in the memory 16B.

Figure 5:
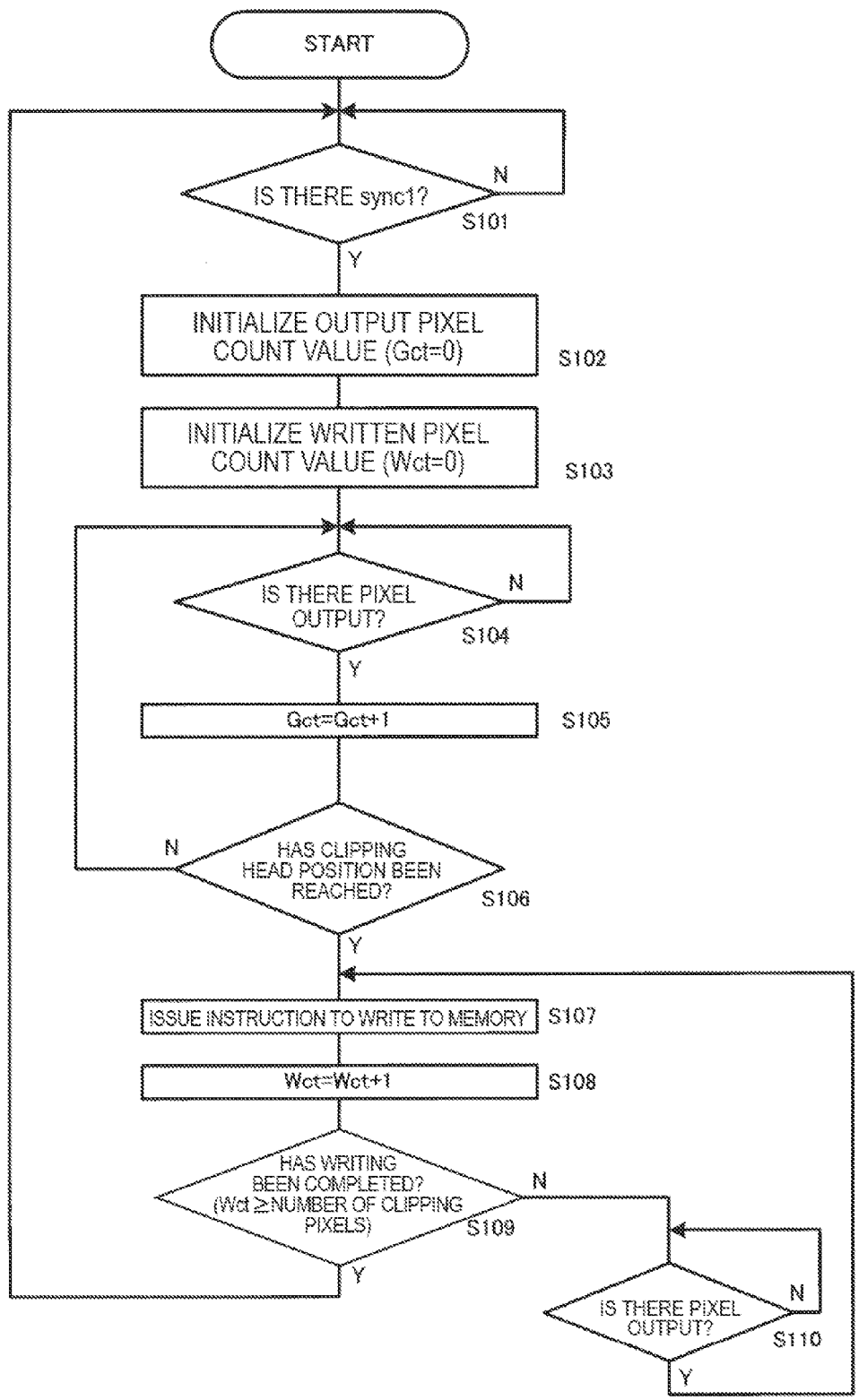
FIG. 5 is a flowchart illustrating a procedure of a specific process executed by a clipping control unit when writing to a memory is controlled.

FIG. 5 is a flowchart illustrating a procedure of a specific process executed by the clipping control unit 16A when writing to a memory is controlled.

First, the clipping control unit 16A waits for the synchronous signal sync1 from the first signal processing unit (step S101), and initializes the output pixel count value Gct and the written pixel count value Wct (0 reset) according to a state in which the synchronous signal sync1 has been detected (steps S102 and S103).

In addition, the clipping control unit 16A waits for a pixel output from the first signal processing unit 15 after initializing the above-described count values (step S104). Then, after the output pixel count value Gct is counted up (Gct=Gct+1) (step S105) when there is a pixel output, and it is determined whether a clipping head position has been reached (step S106). That is, it is determined whether the current output pixel position specified from the output pixel count value Gct has been consistent with the clipping start pixel position indicated as the zoom ratio information.

When a negative result indicating that the clipping head position has not been reached is obtained in the above-described determination, the process returns to step S104 and the pixel output from the first signal processing unit 15 is awaited again.

When a positive result indicating that the clipping head position has been reached is obtained in the above-described determination, the clipping control unit 16A instructs the first signal processing unit 15 to write to the memory 16B (step S107).

In addition, the clipping control unit 16A counts up the written pixel count value Wct (Wct=Wct+1) according to a state in which the writing instruction has been issued (step S108).

After the written pixel count value Wct has been counted up, the clipping control unit 16A determines whether writing has been completed (step S109). Specifically, it is determined whether the written pixel count value Wct is greater than or equal to a value of the number of clipping pixels indicated as the zoom ratio information.

When the negative result indicating that the written pixel count value Wct is not greater than or equal to the indicated number of clipping pixels and the writing has not been completed is obtained, the clipping control unit 16A waits for a pixel output from the first signal processing unit (step S110). Then, when there is a pixel output, the process returns to the above-described step S107, and the first signal processing unit 15 is instructed to write to the memory 16B again.

Thereby, writing corresponding to the indicated number of clipping pixels is executed.

In addition, when the positive result indicating that the written pixel count value Wct is greater than or equal to the indicated number of clipping pixels and the writing has been completed is obtained, the clipping control unit 16A returns to the above-described step S101, and waits for the synchronous signal sync1 to be detected again.

Next, control of a reading side will be described.

In this embodiment, the clipping control unit 16A controls a reading operation by the size conversion unit 17 according to a data accumulation amount of the memory 16B.

First, as an assumption, the size conversion unit 17 of the above-described case is set to issue a request for reading the memory 16B to the clipping control unit 16A as illustrated in FIG. 4.

Specifically, the size conversion unit 17 starts the reading request for the clipping control unit 16A according to a state in which an instruction to start processing corresponding to one frame has been issued by the synchronous signal sync2.

The clipping control unit 16A controls reading of image data from the memory 16B by the size conversion unit 17 according to whether reading permission has been given for the reading request from the size conversion unit 17.

When the reading permission has been issued according to the reading request from the size conversion unit 17, the clipping control unit 16A determines that there is reading of the image data from the memory 16B, and counts up a read pixel count value Rct. It is possible to specify a reading position in a clipping image according to the read pixel count value Rct.

Here, as described above, the clipping control unit 16A counts the written pixel count value Wct for managing the number of times of writing of image data for the memory 16B.

The clipping control unit 16A specifies a capacity (the number of pixels) of image data accumulated in the memory 16B by calculating a difference between the written pixel count value Wct and the above-described read pixel count value Rct, and controls a reading operation by the size conversion unit 17 according to the accumulation amount of the image data of the memory 16B as described above. Specifically, the reading operation by the size conversion unit 17 is controlled so that the above-described reading permission is given when a value of "Wct−Rct" serving as the accumulation amount of the image data exceeds a set threshold value th and the above-described reading permission is not given when the value of "Wct−Rct" does not exceed the set threshold value th.

Figure 6:
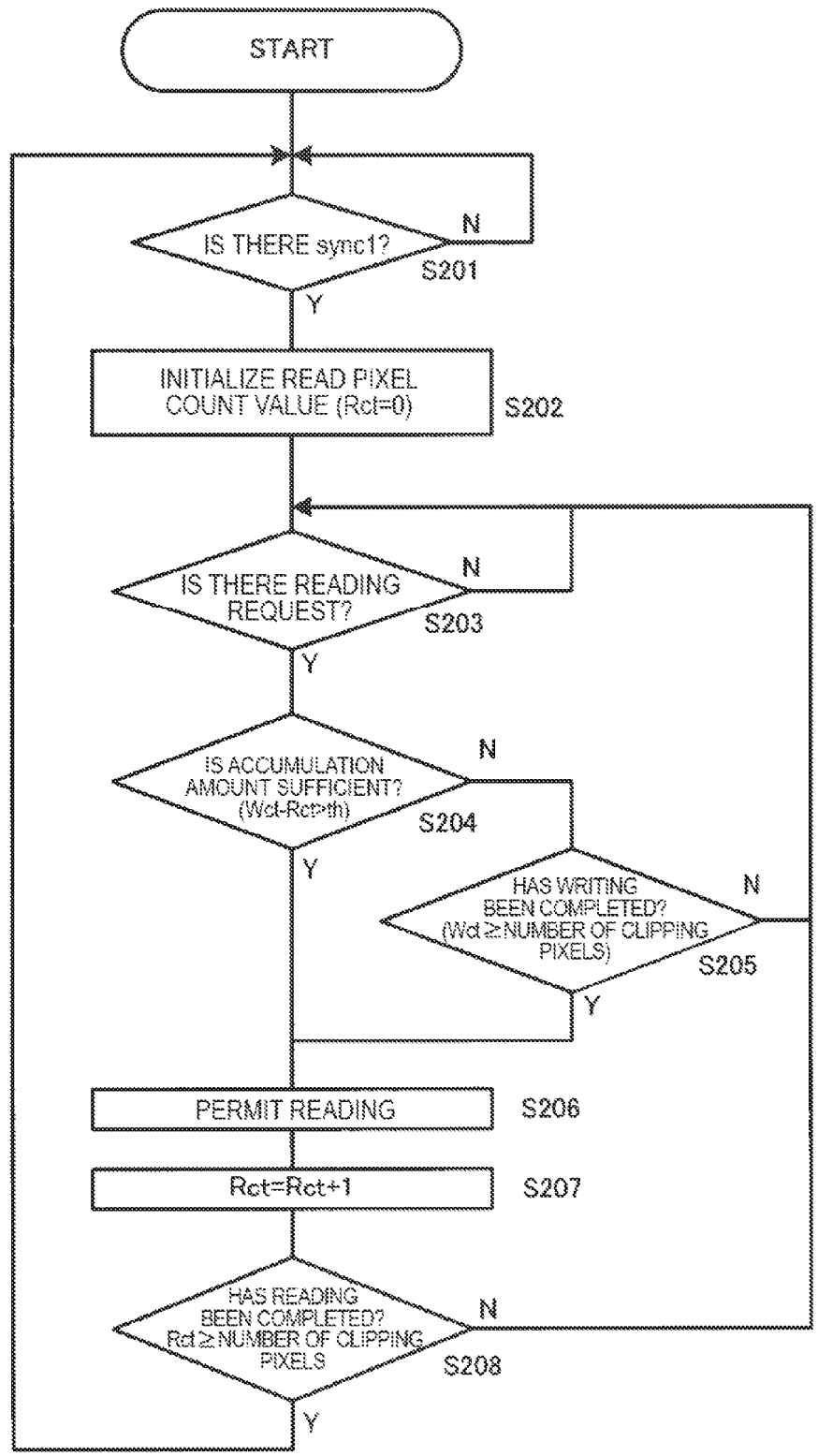
FIG. 6 is a flowchart illustrating a procedure of a specific process executed by the clipping control unit when reading from the memory is controlled.

FIG. 6 is a flowchart illustrating a procedure of a specific process executed by the clipping control unit 16A when the above-described reading control is executed.

First, the clipping control unit 16A waits for the synchronous signal sync1 from the first signal processing unit 15 (step S201), and initializes the read pixel count value Rct (0 reset) according to a state in which the synchronous signal sync1 has been detected (step S202).

Then, after the count value Rct has been initialized, the clipping control unit 16A waits for the reading request from the size conversion unit 17 (step S203).

When there is a reading request from the size conversion unit 17, the clipping control unit 16A determines whether the accumulation amount in the memory 16B is sufficient (step S204). Specifically, it is determined whether the above-described value of "Wct−Rct" has exceeded the set threshold value th.

When the negative result indicating that the value of "Wct−Rct" has not exceeded the set threshold value th and the accumulation amount is not sufficient is obtained in the above-described determination, the clipping control unit 16A determines whether writing has been completed (step S205). That is, in order to determine whether the writing of image data corresponding to a clipping range to the memory 16B by the first signal processing unit 15 has been completed, it is determined whether the written pixel count value Wct is greater than or equal to the number of clipping pixels indicated as the zoom ratio information.

When the negative result indicating that the written pixel count value Wct is not greater than or equal to the number of clipping pixels and writing has not been completed is obtained in the determination in step S205, the clipping control unit 16A returns to the above-described step S203, and waits for the reading request from the size conversion unit 17 again.

On the other hand, when the positive result indicating that the value of "Wct−Rct" has exceeded the set threshold value th and the accumulation amount is sufficient is obtained in the determination of the above-described step S204 or when the accumulation amount is determined not to be sufficient in the determination of the above-described step S204, but the positive result indicating that the writing has been completed in the determination of the above-described step S205 is obtained, the clipping control unit 16A issues the reading permission to the size conversion unit 17 (step S206).

Also, for clarity, all accumulated data should be read to the size conversion unit 17 regardless of the accumulation amount of the memory 16B if the image data corresponding to the clipping range is already written to the memory 16B. Thus, when the positive result is obtained in step S205 as described above, the reading permission is issued to the size conversion unit 17 regardless of the accumulation amount of the memory 16B.

The clipping control unit 16A counts up the read pixel count value Rct (Rct=Rct+1) according to a state in which the reading permission has been issued as described above (step S207).

Then, after the read pixel count value Rct has been counted up as described above, the clipping control unit 16A determines whether the reading has been completed. Specifically, it is determined whether the read pixel count value Rct is greater than or equal to a value of the number of clipping pixels indicated as the zoom ratio information.

When the negative result indicating that the read pixel count value Rct is not greater than or equal to the above-described indicated value of the number of clipping pixels and the reading has not been completed is obtained, the clipping control unit 16A returns to the above-described step S203, and waits for the reading request from the size conversion unit 17.

On the other hand, when the positive result indicating that the read pixel count value Rct is greater than or equal to the above-described indicated value of the number of clipping pixels and the reading has been completed is obtained, the clipping control unit 16A returns to the above-described step S201 and waits for the synchronous signal sync1 again.

Here, a memory capacity necessary for clipping will be described with reference to FIGS. 7A to 7C First, as an assumption, in this example, a rate of writing to the memory 16B by the first signal processing unit also becomes constant according to a state in which a reading rate of the image sensor 3 is constant. Also, in the drawing, the writing rate is denoted by "R_w."

On the other hand, the reading rate ("R_r" in the drawing) of the memory 16B is variable according to a zoom ratio. That is, the reading rate is consistent with the writing rate at a zoom ratio of 1 (without an electronic zoom). When the zoom ratio is further increased, the reading rate is set to be lower than the writing rate. Although a processing time (from a time point 0 to a time point Tfr) corresponding to one frame as illustrated in the drawing is set as a time for processing images corresponding to one frame in each part within the image signal processing unit 5 (see the synchronous signal sync as will be described later), the variable reading rate corresponding to the zoom ratio is set so that reading of a clipping image from the memory 16B is also completed for the processing time corresponding to one frame.

According to this assumption, in clipping of this case, a capacity of the memory 16B should be set so that overtaking of the writing side does not occur.

Figure 7:
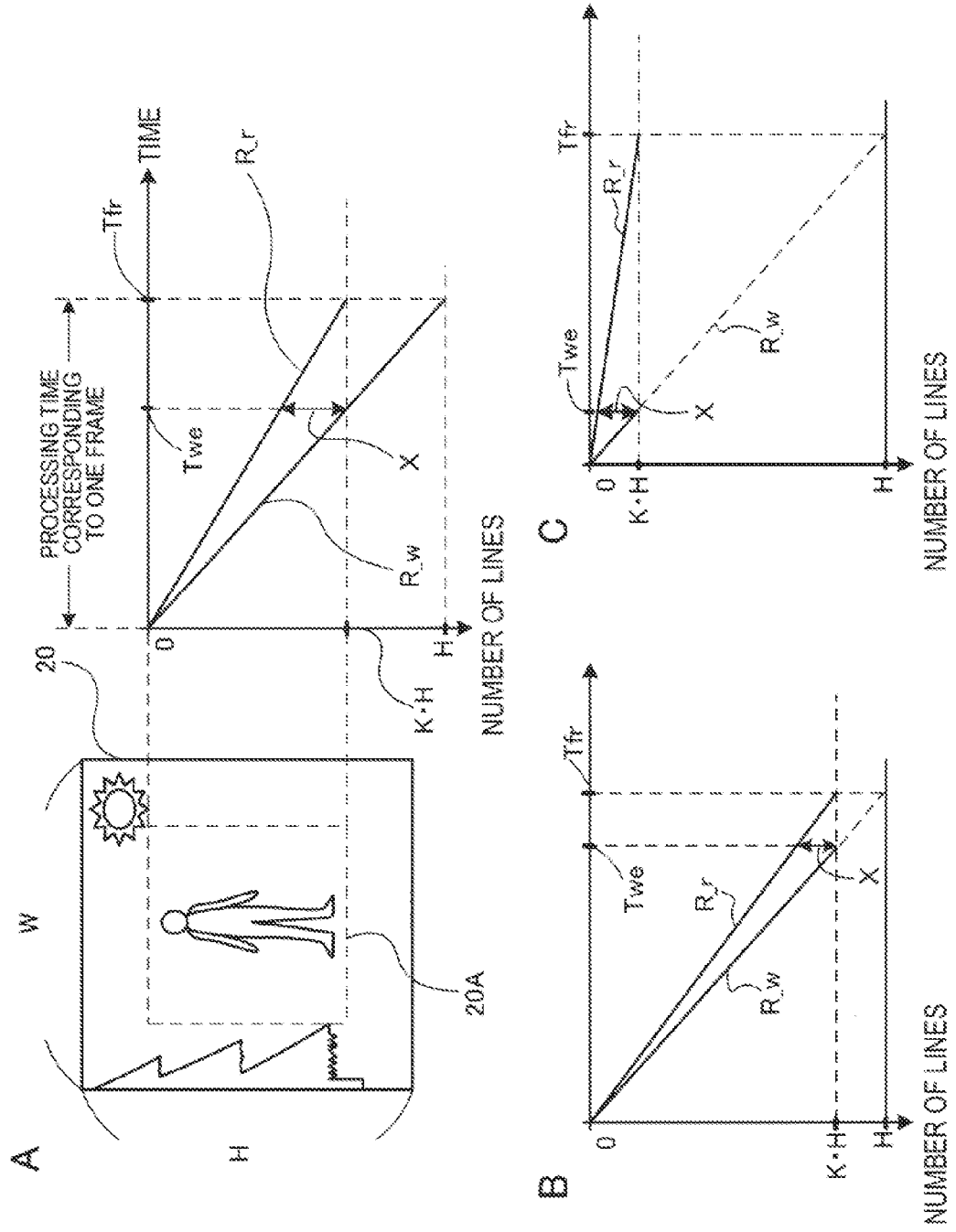
FIGS. 7A to 7C are explanatory diagrams illustrating a memory capacity necessary for clipping.

Among FIGS. 7A to 7C, an image 20 before clipping and a clipping range 20A in the image 20 are illustrated in FIG. 7A. The clipping range 20A is varied according to a set zoom ratio.

In addition, in FIG. 7A, along with the illustration of the image 20 before the clipping and the clipping range 20A, a relationship between the writing rate R_w and the reading rate R_r for the memory 16B is illustrated by designating the horizontal axis as time T and designating the vertical axis as the number of lines on the right of the drawing.

Here, a horizontal size (the number of pixels in the horizontal direction) of the image 20 before clipping is set as W and a vertical size (the number of pixels in the vertical direction) is set as H. In addition, a reciprocal of the zoom ratio is set as K.

According to this, the horizontal size of the clipping range 20A can be represented by K·W and the vertical size can be represented by K·H.

In addition, FIG. 7B illustrates a relationship between the writing rate R_w and the reading rate R_r when the zoom ratio is smaller than in FIG. 7A (that is, a value of K is larger than in FIG. 7A), and FIG. 7C illustrates the relationship between the writing rate R_w and the reading rate R_r when the zoom ratio is larger than in FIG. 7A (that is, the value of K is smaller than in FIG. 7A).

In FIGS. 7A to 7C, a time point at which the writing of all data within the clipping range 20A to the memory 16B ends becomes a time point Twe in each drawing. In addition, in this case, a time point at which the reading of all data within the clipping range 20A from the memory 16B ends becomes a time point Tfr under variable setting of the above-described reading rate R_r.

As is apparent from the drawing, the "processing time corresponding to one frame" indicated at the time point Tfr is consistent with a time taken to write the image 20 (an image of a zoom ratio=1) to the memory 16B.

A capacity of the memory 16B (hereinafter simply also referred to as a necessary memory size) to be set to prevent overtaking of the writing side from occurring will be discussed.

In the cases of FIGS. 7A to 7C, a maximum necessary memory size can be denoted by X in the drawings. Specifically, the maximum necessary memory size is an amount of unread data at the time point Twe at which the entire image of the clipping range 20A has been completely written to the memory 16B.

Here, it can be seen that a value of X serving as the maximum necessary memory size is varied according to the zoom ratio when FIGS. 7A to 7C are compared to each other. Specifically, based on a given zoom ratio, the value of X serving as the maximum necessary memory size is gradually decreased when the zoom ratio is smaller or larger than the given zoom ratio. In other words, the necessary memory size has a maximum value when the zoom ratio becomes a given value (set as a standard zoom ratio).

Accordingly, if the standard zoom ratio is known, then the value of X is referred to as the maximum necessary memory size (that is, the capacity of the memory 16B to be secured to prevent overtaking of the writing side from occurring).

Specifically, in this case, the maximum necessary memory size is derived.

First, because the reading rate R_r is variable according to the zoom ratio (the reading completion time is consistent with Tfr), the writing rate R_w and the reading rate R_r can be expressed as follows.

$$R\_w = (H)/Tfr$$

$$R\_r = (K \cdot H)/Tfr \quad (1)$$

Here, at an arbitrary time point t, the number of written lines is expressed by Expression (2) and the number of read lines is expressed by Expression (3).

$$R\_w \cdot t \quad (2)$$

$$R\_r \cdot t \quad (3)$$

A difference between the two becomes the necessary memory size at the time point t. At this time point t, the necessary memory size M(t) can be expressed by Expression (4).

$$M(t) = H/Tfr - K \cdot H/Tfr \cdot t \quad (4)$$

At this time, if the above-described Expression (4) is converted into an amount of data because an amount of data corresponding to one line to be written/read becomes $K \cdot W$, $M(t)$ is rewritten as Expression (5).

$$M(t) = K \cdot W \cdot (H/Tfr - K \cdot H/Tfr \cdot t) \quad (5)$$

As understood from the above description, a value of $M(t)$ becomes maximum when $t = Twe$. That is, $M(Twe)$ is expressed by Expression (6).

$$M(Twe) = K \cdot (1-K) \cdot W \cdot H \cdot Twe/Tre \quad (6)$$

At this time, referring to FIGS. 7A to 7C, Expression (7) can be obtained according to a similarity principle of a triangle.

$$Twe/Tre = (K \cdot H)/(H) \quad (7)$$

According to this point, a relationship between a necessary memory size and a reciprocal K of a zoom ratio is expressed by the following Expression (8).

$$M(K) = K \cdot K \cdot (1-K) \cdot W \cdot H \quad (8)$$

Here, according to the mathematical extreme principle, a first derivative of $M(K)$ may become 0 when $M(K)$ has a maximum value/minimum value.

The first derivative of $M(K)$ is expressed by Expression (9)

$$dM(K) = (2K - 3K \cdot K) \cdot W \cdot H \quad (9)$$

Thereby, when $K=0$ and $K=\frac{2}{3}$, $M(K)$ has an extreme value.

Further, according to the analysis of a second derivative, it can be seen that an extreme value point has a minimum value (0) when $K=0$ and an extreme value point has a maximum value when $K=\frac{2}{3}$.

According to the above, when $K=\frac{2}{3}$, that is, when the zoom ratio=1.5, the necessary memory size becomes maximum. The maximum value is calculated as "$\frac{4}{27} \cdot W \cdot H$" from the above-described Expression (8).

As described above, it is only necessary to secure at least a capacity of $\frac{4}{27}$ of the size of the image 20 before clipping as the capacity of the memory 16B for preventing the overtaking of the writing side.

[3.3. Synchronous Transfer]

Here, in this embodiment, the synchronous transfer is set to be performed in correspondence with the implementation of the electronic zoom function according to clipping.

First, as an assumption, normal synchronous propagation will be described with reference to FIGS. 8A to 8G.

Figure 8:
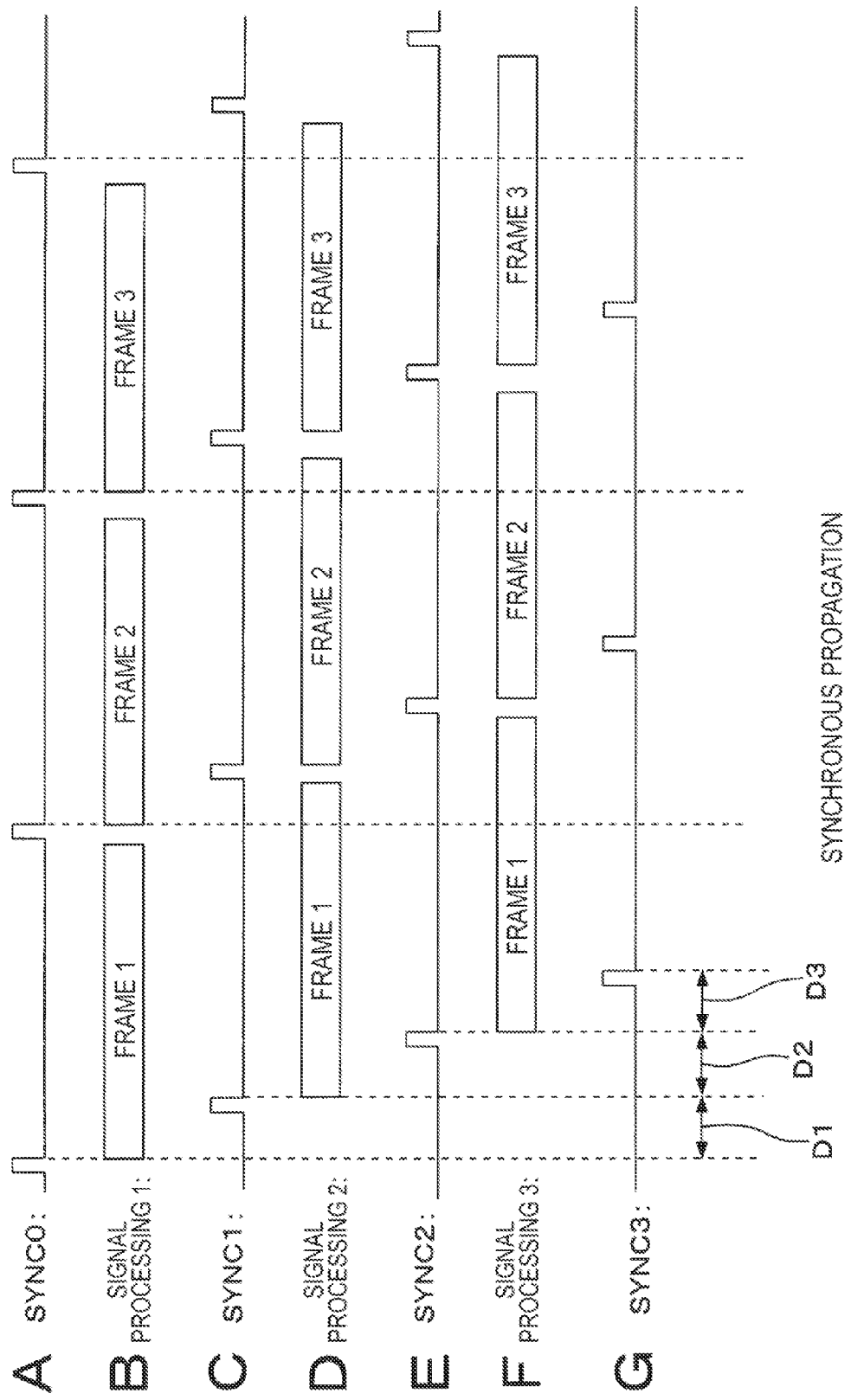
FIGS. 8A to 8G are explanatory diagrams illustrating normal synchronous propagation.

In FIGS. 8A to 8G, it is assumed that an image signal is processed in the order of signal processing 1→signal processing 2→signal processing 3. A synchronous signal SYNC0 illustrated in FIG. 8A, a synchronous signal SYNC1 illustrated in FIG. 8C, and a synchronous signal SYNC2 illustrated in FIG. 8E are signals representing start timings of a processing time for one frame in the signal processing 1, the signal processing 2, and the signal processing 3. SYNC3 of FIG. 8G is a signal representing a start timing of the processing time for the one frame in signal processing of a subsequent stage of the signal processing 3.

In FIGS. 8B, 8D, and 8F, frames 1 to 3 illustrated in white represent frame processing times of the frames 1 to 3 allocated to the signal processing 1, 2, and 3 based on SYNC1, SYNC2, and SYNC3, respectively.

For the synchronous signal SYNC1 output from the signal processing 1 to the signal processing 2, a delay denoted by D1 in the drawing is assigned to the synchronous signal SYNC0 input to the signal processing 1. The delay D1 becomes a delay corresponding to a processing time of the signal processing 1.

In addition, for the synchronous signal SYNC2 output from the signal processing 2 to the signal processing 3, a delay denoted by D2 in the drawing is assigned to the synchronous signal SYNC1 input to the signal processing 2. The delay D2 becomes a delay corresponding to a processing time of the signal processing 2.

In addition, for the synchronous signal SYNCS output from the signal processing 3, a delay denoted by D3 in the drawing is assigned to the synchronous signal SYNC2 input to the signal processing 3. The delay D3 becomes a delay corresponding to a processing time of the signal processing 3.

In the normal synchronous propagation as described above, a synchronous signal to which a delay D corresponding to a processing time necessary for each signal processing of the signal processing 1 to 3 is assigned is propagated to signal processing of the next stage.

For this, the above-described synchronous transfer is performed in correspondence with a state in which the clipping unit 16 performs an electronic zoom process according to clipping in this embodiment.

Figure 9:
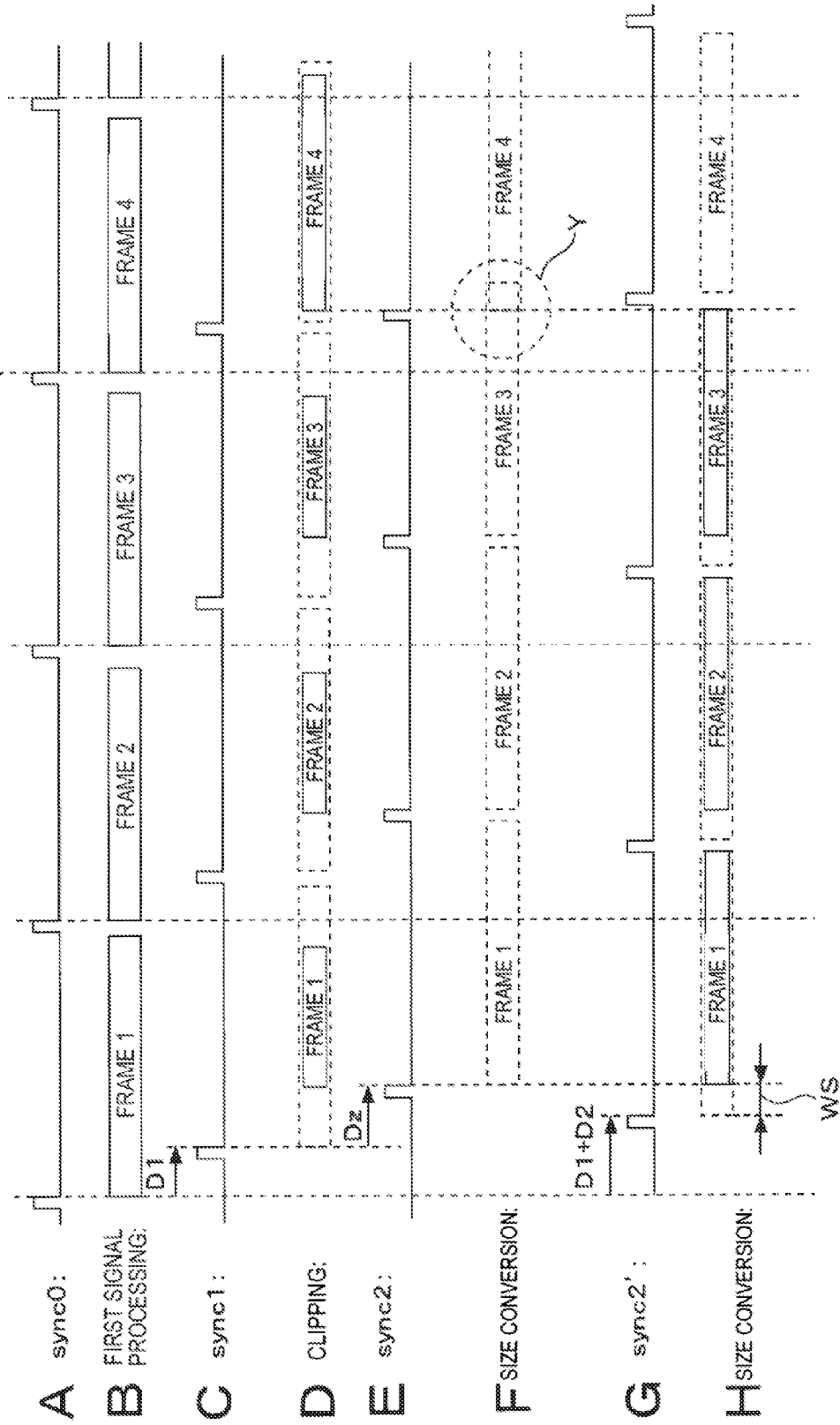
FIGS. 9A to 9H are explanatory diagrams illustrating a synchronous transfer.

FIGS. 9A to 9H are explanatory diagrams illustrating the synchronous transfer;

FIG. 9A illustrates a synchronous signal sync0 input to the first signal processing unit 15, FIG. 9C illustrates a synchronous signal sync1 output from the first signal processing unit 15 to the clipping control unit 16A, and FIG. 9E illustrates a synchronous signal sync2 output from the clipping control unit 16A to the size conversion unit 17.

FIG. 9B illustrates a processing time for every frame of the first signal processing unit 15 set based on the synchronous signal sync0, FIG. 9D illustrates a processing time for every frame of the clipping control unit 16A set based on the synchronous signal sync1, and FIG. 9F illustrates a processing time for every one frame of the size conversion unit set based on the synchronous signal sync2. Here, four frames from a frame 1 to a frame 4 are illustrated as processing times for every frame illustrated in FIGS. 9B, 9D, and 9E. In FIGS. 9D and 9F, a frame indicated by a dashed line means a processing time for one frame set based on the synchronous signal sync.

Also, for clarity, in moving-image capturing, completion of processing within one cycle set in the synchronous signal sync is requested. When the request is not satisfied, it is difficult to implement a constant frame rate.

First, in view of a relationship between the synchronous signal sync0 and the synchronous signal sync1, a delay (D1 in the drawing) corresponding to a processing time of the first signal processing unit 15 is given to the synchronous signal sync0 in the synchronous signal sync1. In other words, the synchronous signal sync1 obtained by assigning the delay D1 to the synchronous signal sync0 is input to the clipping control unit 16A.

Here, the case in which the synchronous signal sync to which a delay similar to that of normal synchronous propagation is assigned, that is, the synchronous signal sync (sync2) to which a delay for the processing time of the clipping control unit 16A is assigned, is output from the clipping control unit 16A to the size conversion unit 17 is considered.

FIG. 9G illustrates a waveform of the above-described synchronous signal sync2', and FIG. 9F illustrates a processing time for every one frame of the size conversion unit 17 when the synchronous signal sync2' has been assigned.

When the delay D corresponding to the processing time by the clipping control unit 16A is designated as D2, the synchronous signal sync2' can indicate that a delay of "D1+D2" is assigned to the synchronous signal sync0 as illustrated in FIG. 9G.

Here, it should be noted that, when an electronic zoom process by clipping is performed, a timing at which data to be processed is read to the size conversion unit 17 is later than a head timing of the processing time (FIG. 9D) for one frame set for a clipping process. This is because a time difference from when an output of head pixel data of an image before clipping from the first signal processing unit 15 is started to when pixel data of a head of a clipping range is written to the memory 16B occurs when the electronic zoom process by clipping is performed using the memory 16B as described above.

In FIG. 9H, a frame of a dashed line indicates a processing time set in the size conversion unit 17 based on the synchronous signal sync2', and a frame of a solid line indicates a time in which pixel data can be read from the memory 16B and actually processed.

From a comparison therebetween, an idle part of processing occurs in the size conversion unit 17 (WS in the drawing) when the clipping control unit 16A has output the synchronous signal sync2' to which a delay similar to that of the normal synchronous propagation is assigned to the size conversion unit 17. That is, the lack of a processing time for WS occurs.

Therefore, in order to appropriately secure the processing time, the synchronous transfer is performed between the clipping control unit 16A and the size conversion unit 17 by delaying the synchronous signal sync2 assigned to the size conversion unit 17 by an amount corresponding to a zoom ratio.

Specifically, in this case, a delay indicated by "Dz" is assigned between FIG. 9D and FIG. 9E.

This delay Dz corresponds to a time difference between a timing at which an output of head pixel data of an image before clipping is started in the first signal processing unit 15 and a timing at which head pixel data of a clipping range is written to the memory 16B. This time difference becomes a value corresponding to an indicated zoom ratio. Accordingly, the delay Dz becomes a delay for an amount corresponding to the zoom ratio.

The synchronous signal sync2 to which the above-described delay Dz has been assigned is output from the clipping control unit 16A to the size conversion unit 17, and hence the above-described idle part as illustrated in FIG. 9H does not occur in the size conversion unit 17 as illustrated in FIG. 9F, and the processing time by the size conversion unit 17 can be appropriately secured.

In order to implement the above-described synchronous transfer, the clipping control unit 16A issues the synchronous signal sync2 after waiting for the first signal processing unit 15 to write the head pixel data of the clipping range to the memory 16B after receiving the synchronous signal sync1 from the first signal processing unit 15.

Specifically, the synchronous signal sync2 is issued according to a state in which a current pixel position specified by the above-described output pixel count value Gct has been consistent with a clipping start pixel position indicated by zoom ratio information.

Incidentally, because the head pixel position of the clipping range is also changed when the zoom ratio has fluctuated, there is a case in which the size conversion unit 17 has not yet completed processing for a previous frame even when the head pixel data of the clipping range is occasionally written to the memory 16B.

FIGS. 9A to 9H illustrate an example in which there is a changing point of the zoom ratio between the frame 3 and the frame 4.

When the synchronous signal sync2 delayed by an amount corresponding to the zoom ratio is output as in this embodiment, there is a case in which a processing time in a frame before a zoom ratio change is eroded as indicated by Y in FIGS. 9A to 9H.

The above-described erosion of the processing time occurs, and hence there is a case in which processing for a previous frame has not yet been completed in the size conversion unit 17 even when the head pixel data of the clipping range is written to the memory 16B.

Therefore, as issuance conditions of the synchronous signal sync2, it is possible to set not only a condition that the first signal processing unit 15 have written the head pixel data of the clipping range to the memory 16B, but also a condition that processing for a previous frame in the size conversion unit 17 be completed.

Specifically, in this case, the clipping control unit 16A determines whether a current pixel position specified by the output pixel count value Gct as described above is consistent with a clipping start pixel position indicated by the zoom ratio information and determines whether the size conversion unit 17 has completed processing for a previous frame.

Therefore, when the determination results indicate that the condition that the processing for the previous frame be completed and the condition that the current pixel position specified by the output pixel count value Gct be consistent with the clipping start pixel position indicated by the zoom ratio information have been satisfied, the synchronous signal sync2 is issued.

Thereby, the processing time of the size conversion unit 17 can be appropriately secured while the erosion of processing for a previous frame is prevented.

By performing a synchronous transfer corresponding to the above-described zoom ratio, a processing time after the size conversion unit 17 can be secured while a synchronous delay is minimized, and the smooth transition of the zoom ratio is possible.

4. Modified Example

Although the embodiment in accordance with the present technology has been described above, the present technology is not limited to the above-described specific examples.

For example, although an operation of performing control corresponding to a memory accumulation amount only at the reading side in relation to writing/reading to/from the memory for clipping has been described above, control corresponding to the memory accumulation amount may also be performed at the writing side.

Figure 10:
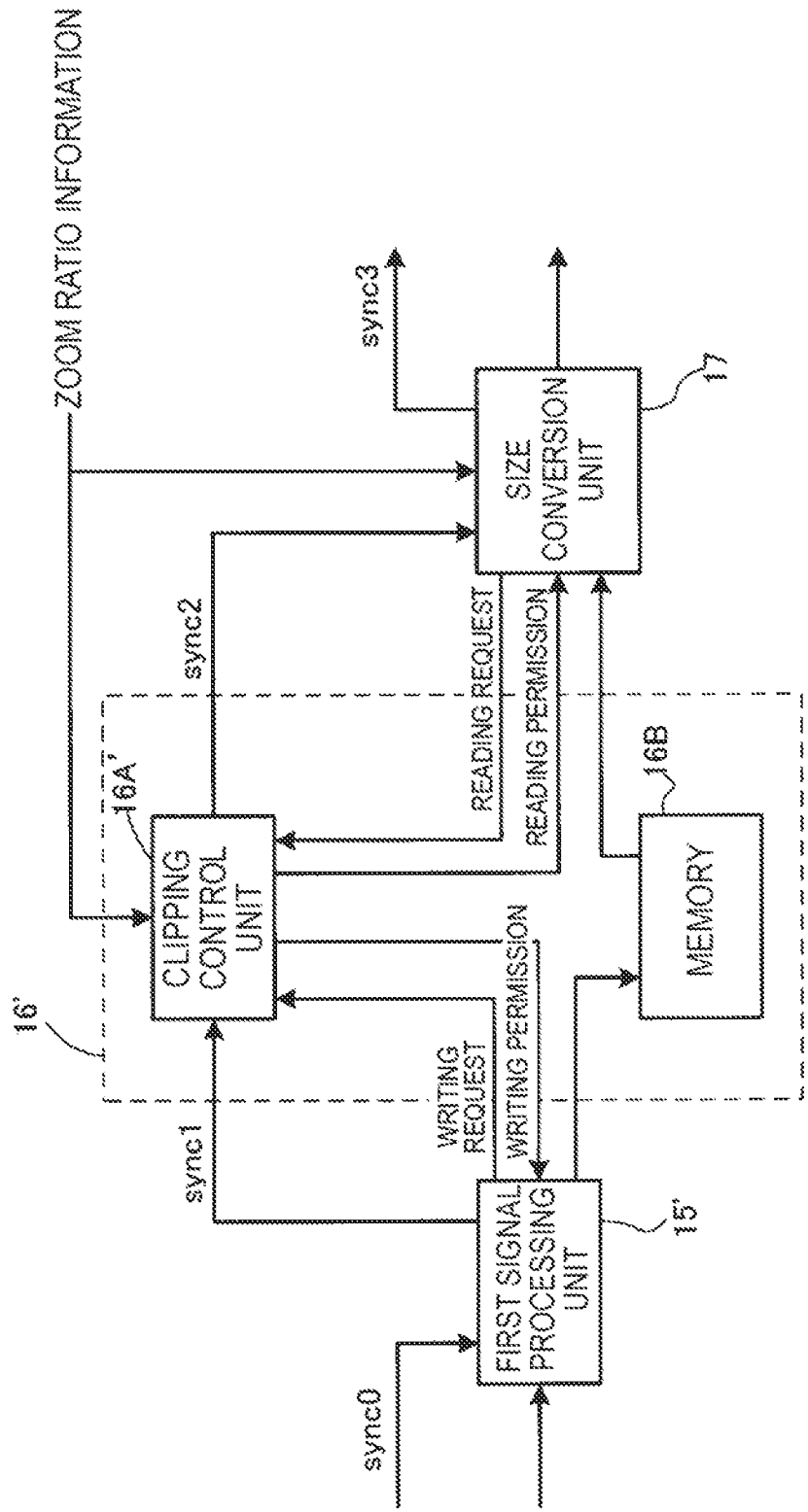
FIG. 10 is a diagram illustrating a configuration to be adopted when control corresponding to a memory accumulation amount is performed at a writing side.

FIG. 10 illustrates a configuration to be adopted when control corresponding to a memory accumulation amount is performed at the writing side as described above.

The same reference signs are assigned to parts of FIG. 10 similar to those described above, and description thereof is omitted.

In this case, unlike the above-described configuration illustrated in FIG. 4, a clipping unit 16' is provided instead of the clipping unit 16. Specifically, the clipping unit 16' is different from the above-described clipping unit 16 in that a first signal processing unit 15' is provided instead of the first signal processing unit 15 and a clipping control unit 16A' is provided instead of the clipping control unit 16A.

Unlike the first signal processing unit 15, the first signal processing unit 15' issues a writing request to the clipping control unit 16A'. Specifically, the first signal processing unit 15' issues the writing request to the clipping control unit 16A' every time there is an output of pixel data subjected to its own processing. In addition, the first signal processing unit 15' writes pixel data for which writing permission has been issued from the clipping control unit 16A' to the memory 16B.

Figure 11:
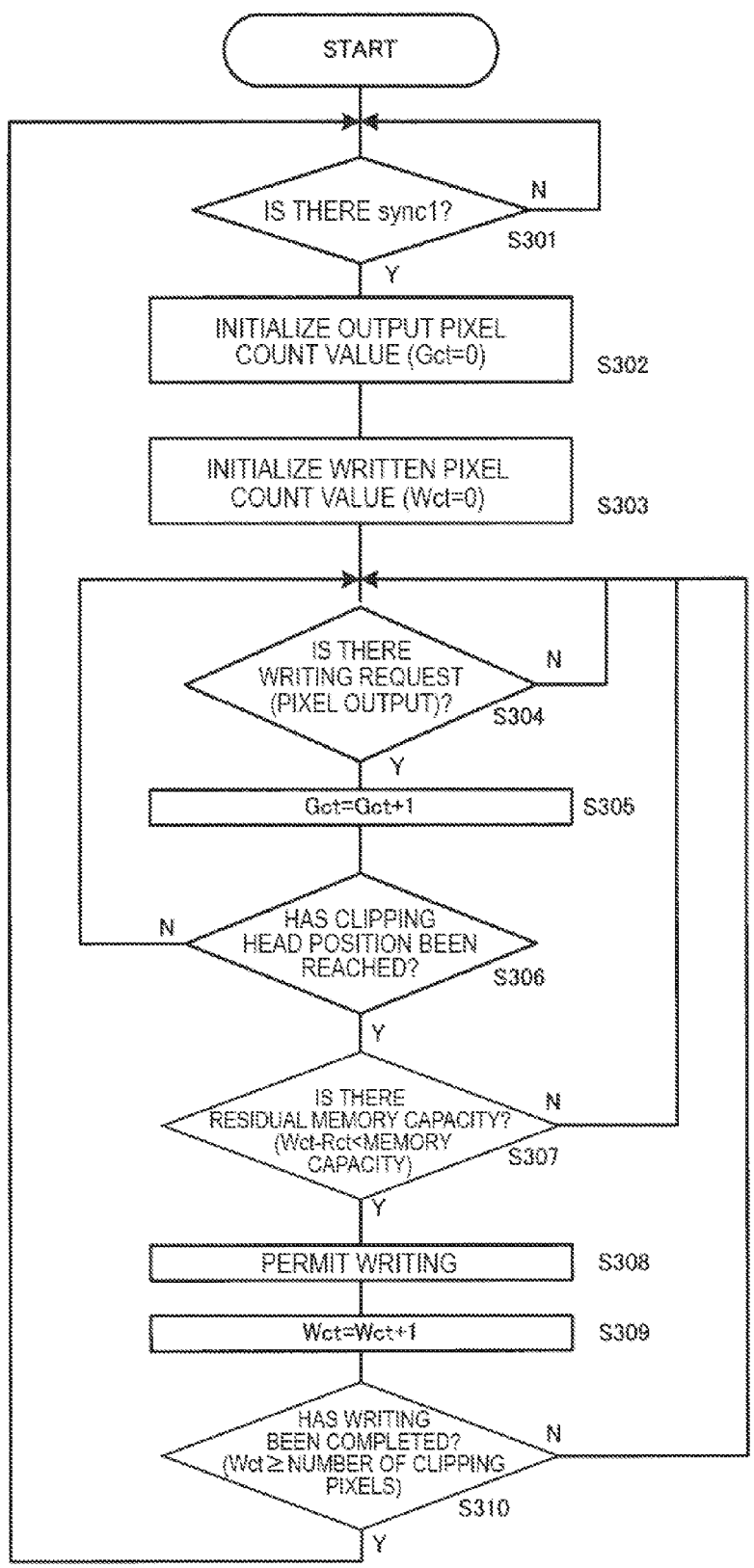
FIG. 11 is a flowchart illustrating a procedure of a specific process executed when writing control corresponding to a memory accumulation amount is performed.

FIG. 11 is a flowchart illustrating a procedure of a specific process executed by the clipping control unit 16A' when writing control corresponding to a memory accumulation amount is performed.

First, the clipping control unit 16A' waits for the synchronous signal sync1 from the first signal processing unit 15' (step S301), and initializes the output pixel count value Gct and the written pixel count value Wct (0 reset) according to a state in which the synchronous signal sync1 has been input (steps S302 and S303).

After the count values Gct and Wct have been initialized, the clipping control unit 16A' waits for the writing request from the first signal processing unit 15'(step S304). In other words, a pixel output from the first signal processing unit 15' is awaited.

When there is a writing request from the first signal processing unit 15', the clipping control unit 16A' has counted up the output pixel count value Gct (Gct=Gct+1) (step S305), and then determines whether the clipping head position has been reached (step S306). That is, it is determined whether the pixel position specified from the output pixel count value Gct has been consistent with a clipping start pixel position indicated by the zoom ratio information.

When the negative result indicating that the clipping head position has not been reached is obtained, the clipping control unit 16A' waits for a writing request from the first signal processing unit 15' again by returning to step S304.

On the other hand, when the positive result indicating that the clipping head position has been reached is obtained, the clipping control unit 16A' determines whether there is a residual memory capacity (step S307). Specifically, it is determined whether a data accumulation amount in the memory 16B calculated by "Wct−Rct" is less than a capacity of the memory 16B.

When the negative result indicating that a value of "Wct−Rct" is not less than the capacity of the memory 16B and there is no residual memory capacity is obtained in the determination, the clipping control unit 16A' waits for the writing request from the first signal processing unit 15' by returning to the above-described step S304. That is, when the residual memory capacity is determined to be absent, the writing to the memory 16B is prohibited even when the clipping head position has been reached.

In addition, when the positive result indicating that the value of "Wct−Rct" is less than the capacity of the memory 16B and there is a residual memory capacity is obtained, the clipping control unit 16A' issues the writing permission to the size conversion unit 17 (step S308), and counts up the written pixel count value Wct (Wct=Wct+1) (step S309).

After the written pixel count value Wct has been counted up, the clipping control unit 16A' determines whether writing has been completed (step S310). That is, it is determined whether the written pixel count value Wct is greater than or equal to a value of the number of clipping pixels indicated as the zoom ratio information.

When the negative result indicating that the written pixel count value Wct is not greater than or equal to the indicated value of the number of clipping pixels and the writing has not been completed is obtained, the clipping control unit 16A' waits for the writing request from the first signal processing unit 15' by returning to the above-described step S304.

On the other hand, when the positive result indicating that the written pixel count value Wct is greater than or equal to the indicated value of the number of clipping pixels and the writing has been completed is obtained, the clipping control unit 16A' waits for the synchronous signal sync1 to be detected again by returning to step S301.

The overload of the memory 16B can be prevented by performing the above-described writing control.

In addition, although an example in which a memory for use in the clipping process is provided within the clipping unit 16 has been described above, a shared memory serving as the memory unit 9 illustrated in FIG. 1 described above can be used as the memory.

Figure 12:
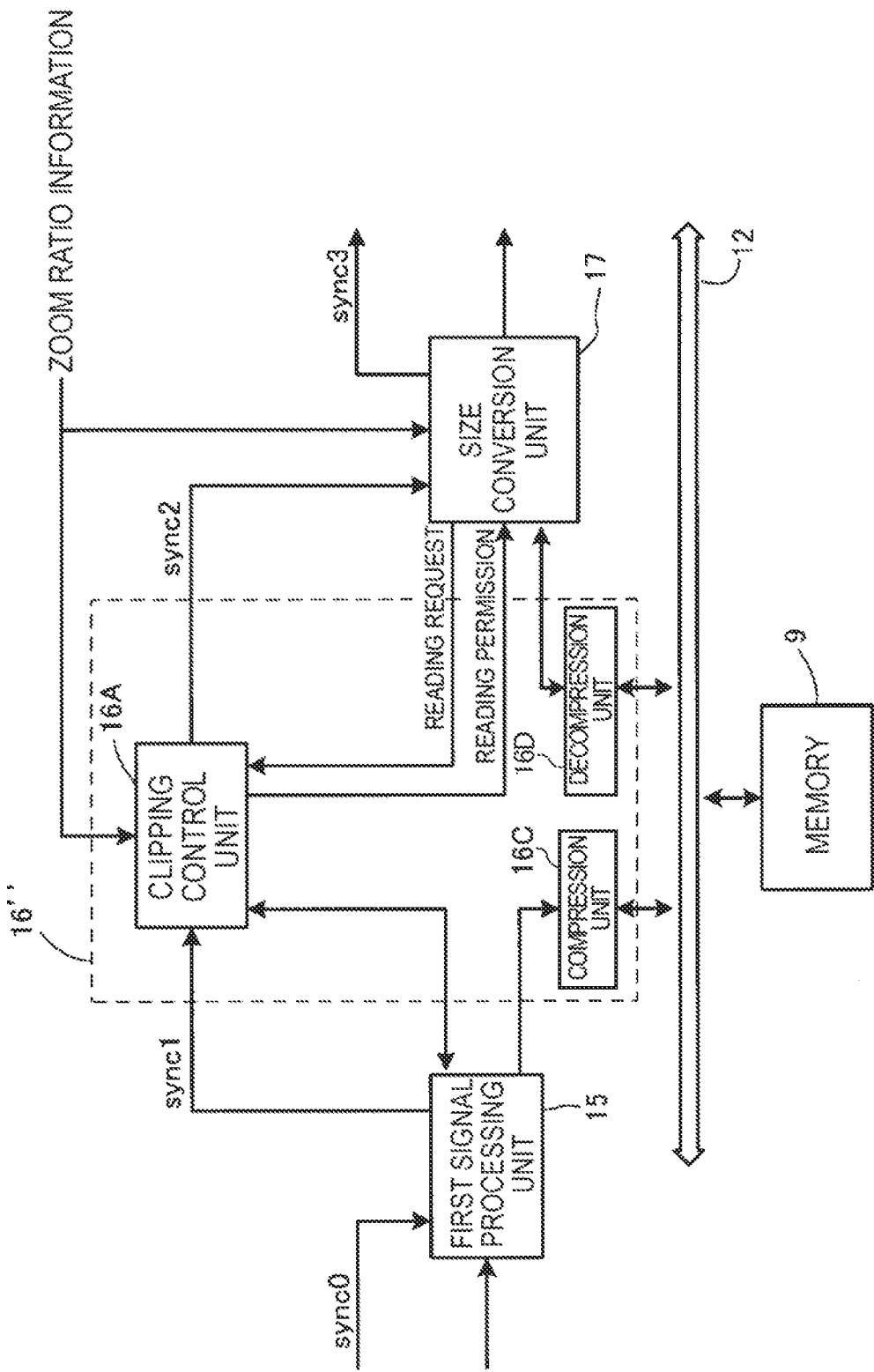
FIG. 12 is an explanatory diagram illustrating a configuration serving as a modified example including a compression unit and a decompression unit.

Although a band of the bus 12 is consumed according to the electronic zoom process when the memory unit 9 is used as a memory for clipping, a compression unit 16C, which compresses data written to the memory unit 9, and a decompression unit 16D, which decompresses the compressed data read from the memory unit 9, can be provided as illustrated in FIG. 12 so as to reduce the above-described consumption of the band of the bus and the consumption of the capacity of the memory unit 9.

Here, both the compression unit 16C and the decompression unit 16D are provided within a clipping unit 16" as illustrated.

Also, the same reference signs are assigned to parts of FIG. 12 similar to those described above, and description thereof is omitted.

The compression unit 16C performs a process of compressing written data from the first signal processing unit 15 according to a predetermined data compression scheme and transmits the compressed data on the bus 12.

The decompression unit 16D performs a process of decompressing compressed data read from the memory unit 9 to the size conversion unit 17 via the bus 12, and transmits the decompressed read data to the size conversion unit 17.

Even when the universal compression/decompression technique is adopted, the compression rate of at least ½ or more can be obtained. Accordingly, it is possible to effectively suppress an increase in a bus band and capacity consumption of the memory unit 9 according to execution of an electronic zoom process using the above-described configuration.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A moving-image capturing apparatus including:
a clipping unit configured to clip an image signal according to an image size read from an image sensor based on zoom ratio information; and
a size conversion unit configured to perform an image size conversion process as necessary on the image signal clipped by the clipping unit based on the zoom ratio information.

(2) The moving-image capturing apparatus according to (1),
wherein the clipping unit selectively accumulates image signals of a clipping target range specified from the zoom ratio information in a memory, and
wherein the size conversion unit obtains the clipped image signal by reading the image signals accumulated in the memory.

(3) The moving-image capturing apparatus according to (2), wherein the clipping unit controls a memory reading operation by the size conversion unit according to a data accumulation amount in the memory.

(4) The moving-image capturing apparatus according to (2), wherein the clipping unit delays a synchronous signal representing a processing start timing for every frame by a time length corresponding to the zoom ratio information, and outputs the delayed synchronous signal to the size conversion unit.

(5) The moving-image capturing apparatus according to (4), wherein the clipping unit outputs the synchronous signal to the size conversion unit according to whether a head part of the clipping target range has been accumulated in the memory.

(6) The moving-image capturing apparatus according to (5), wherein the clipping unit determines whether the head part of the clipping target range has been accumulated in the memory and whether the size conversion unit has completed a size conversion process corresponding to a previous frame, and outputs the synchronous signal to the size conversion unit when positive results have been obtained in the both determinations.

(7) The moving-image capturing apparatus according to any one of (2) to (6), including:
a compression processing unit configured to perform a compression process on an image signal written to the memory; and
a decompression processing unit configured to perform a decompression process on an image signal read from the memory.

What is claimed is:

1. A moving-image capturing apparatus comprising:
a control device;
a clipping unit configured to perform a clip operation in which an image signal is clipped according to an image size read from an image sensor based on zoom ratio information; and
a size conversion unit configured to perform an image size conversion process on the image signal clipped by the clipping unit as necessary,
said control device configured to (i) cause the clipping unit to perform the clip operation before the size conversion unit performs the image size conversion process, and (ii) determine a size reduction amount on the image signal clipped by the clipping unit based on the zoom ratio information and, only when a size reduction is determined to be necessary, to cause the size conversion unit to perform the image size conversion process on the image signal clipped by the clipping unit so as to cause a size of an image corresponding to the image signal after being clipped to be reduced, such that an enlargement of the size of the image corresponding to the image signal after being clipped is not performed by the size conversion unit.

2. The moving-image capturing apparatus according to claim 1,
wherein the clipping unit selectively accumulates image signals of a clipping target range specified from the zoom ratio information in a memory, and
wherein the size conversion unit obtains the clipped image signal by reading the image signals accumulated in the memory.

3. The moving-image capturing apparatus according to claim 2, wherein the clipping unit controls a memory reading operation by the size conversion unit according to a data accumulation amount in the memory.

4. The moving-image capturing apparatus according to claim 2, wherein the clipping unit delays a synchronous signal representing a processing start timing for every frame by a time length corresponding to the zoom ratio information, and outputs the delayed synchronous signal to the size conversion unit.

5. The moving-image capturing apparatus according to claim 4, wherein the clipping unit outputs the synchronous signal to the size conversion unit according to whether a head part of the clipping target range has been accumulated in the memory.

6. The moving-image capturing apparatus according to claim 5, wherein the clipping unit determines whether the head part of the clipping target range has been accumulated in the memory and whether the size conversion unit has completed a size conversion process corresponding to a previous frame, and outputs the synchronous signal to the size conversion unit when positive results have been obtained in the both determinations.

7. The moving-image capturing apparatus according to claim 2, comprising:
a compression processing unit configured to perform a compression process on an image signal written to the memory; and
a decompression processing unit configured to perform a decompression process on an image signal read from the memory.

8. The moving-image capturing apparatus according to claim 1, in which the size reduction amount is an amount to reduce a size of the image corresponding to the image signal after being clipped by the clipping unit to a size of a moving image.

9. An electronic zoom method for a moving image, comprising:
performing a clip operation in which an image signal is clipped according to an image size read from an image sensor based on zoom ratio information;
performing an image size conversion process on the image signal clipped by the clipping unit as necessary; and
causing by use of a control device the clip operation to be performed before the image size conversion process is performed, and determining by use of the control device a size reduction amount on the clipped image signal based on the zoom ratio information and, only when a size reduction is determined to be necessary, causing the image size conversion process to be performed on the clipped image signal so as to cause a size of an image corresponding to the image signal after being clipped to be reduced, such that an enlargement of the size of the image corresponding to the image signal after being clipped is not performed.

* * * * *